United States Patent [19]

Henderson et al.

[11] Patent Number: 4,795,651
[45] Date of Patent: Jan. 3, 1989

[54] FLOTATION SEPARATION OF AFLATOXIN-CONTAMINATED GRAIN OR NUTS

[75] Inventors: James C. Henderson; Stanley H. Kreutzer; Arthur A. Schmidt; Charles A. Smith; William R. Hagen, all of Cincinnati, Ohio

[73] Assignee: The Procter & Gamble Company, Cincinnati, Ohio

[21] Appl. No.: 46,592

[22] Filed: May 4, 1987

[51] Int. Cl.[4] ................................................ A23L 1/10

[52] U.S. Cl. .................................... 426/456; 426/460; 426/481; 426/507

[58] Field of Search ............... 426/456, 460, 462, 481, 426/507, 629, 632

[56] References Cited

U.S. PATENT DOCUMENTS

| | | | |
|---|---|---|---|
| 3,890,452 | 6/1975 | Brandt et al. | 426/632 |
| 4,035,518 | 7/1977 | Carmona et al. | 426/632 |
| 4,215,040 | 7/1980 | Hager | 426/656 |
| 4,542,687 | 9/1985 | Johnson | 426/484 |

FOREIGN PATENT DOCUMENTS

| | | |
|---|---|---|
| 3309296A | 9/1984 | Fed. Rep. of Germany . |
| 217440A | 1/1985 | Fed. Rep. of Germany . |
| 1165351A | 7/1985 | U.S.S.R. . |

*Primary Examiner*—George Yeung

*Attorney, Agent, or Firm*—Richard C. Witte; Ronald L. Hemingway; Rose Ann Dabek

[57] ABSTRACT

Disclosed is a method for separating mycotoxin-contaminated grains, kernels, seeds and nuts, from uncontaminated whole grain seeds, whole or split kernel nuts and seeds to obtain a substantially uncontaminated supply source of these foods. The separate contaminated source can be further processed to lower the mycotoxin contamination. The process involves the separation of the mycotoxin or aflatoxin-containing materials by floating the aflatoxin-contaminated foods in a liquid having a specific gravity of from about 0.9 to about 1.2. A highly preferred process uses dynamic flotation.

24 Claims, 2 Drawing Sheets

FLOTATION SEPARATION OF AFLATOXIN-CONTAMINATED GRAIN OR NUTS

FIELD OF THE INVENTION

This invention relates to a method for separating mycotoxin-contaminated grains, kernels, seeds and nuts, from uncontaminated whole grain seeds, whole or split kernels, nuts and seeds to obtain a substantially uncontaminated supply source of these foods. The process involves the separation by specific gravity of the mycotoxin-containing materials by floating the mycotoxin-contaminated foods in a liquid. Preferably, the separate contaminated source can be further processed to provide foodstuffs with safe levels of mycotoxin.

BACKGROUND OF THE INVENTION

Mycotoxins are a broad class of toxic materials produced by the growth of fungi on foods. Aflatoxin is a specific mycotoxin produced by the action of a fungi belonging to the genus, Aspergillus, on grain, seeds, kernels or nuts. Aflatoxin contamination is particularly a problem in the peanut industry. In addition, aflatoxin can affect grains such as corn and hops, oilseeds, such as cottonseed, soybean, almonds, brazel nuts, pecans, pistachios, etc. The growth of fungi which produce aflatoxin is favored under the same conditions which are good for growing nuts and grains.

High levels of aflatoxin in foods presents a threat to animals and humans since aflatoxins at high levels have been shown to cause cancer in laboratory animals. For this reason, the USDA has set limits on the amount of aflatoxin and other mycotoxins that can be in food products.

There have been attempts to detoxify aflatoxin-contaminated food sources, but in general these have had very limited success, often with undesirable side effects, either flavor degradation or destruction of the food itself. Therefore, the general treatment of aflatoxin-contaminated material is to attempt to separate the aflatoxin-contaminated material from the uncontaminated materia. Alfatoxin contamination occurs within single grains, kernels, nuts, or peanuts. Therefore, removal of contaminated materials is usually done by sorting using an optical detector and also by manually removing damaged nuts. However, this method is not good for detecting aflatoxin-contaminated whole nuts which do not in any way appear to be damaged.

One method of color sorting is described in U.S. Pat. No. 4,035,518 in which aflatoxin-contaminated grains, corn and nuts are contacted with an aqueous solution containing a water soluble, food-compatible aflatoxin agent at elevated temperatures for a short period of time. The nuts are then washed with water. The aflatoxin agent causes the aflatoxin-contaminated nuts to undergo a sharp, almost immediate visual change. The nuts are then sorted by color. Aflatoxin agents are generally alkaline materials such as potassium hydroxide, sodium hydroxide, etc.

Generally, the amount of contamination of a corn, grain, seed or nut product is measured by the parts per billion or parts per million aflatoxin in a sample of the product. If the parts per billion is below the acceptable limit for the end food use, the sample or lot of material will be processed. However, if sampling misses several highly contaminated materials, some of the final product could be very high in aflatoxin even though the lot sampled at low aflatoxin level. Also, sampling variations can cause basically good lots of grain, nuts or seeds to test high and be declared inedible. Therefore, a process which would separate contaminated nuts or grains, particularly those which appear to be undamaged, is highly valuable. This process would allow the separation of contaminated whole grains, nuts or seeds from other undamaged whole products, thus lowering the mycotoxin or aflatoxin level in the entire batch.

Surprisingly, it has been found that aflatoxin-contaminated seeds, grains or nuts have a lower specific gravity then uncontaminated seeds, nuts or grain. Therefore, the aflatoxin-containing nuts can be separated using a liquid flotation process. A highly preferred process is dynamic flotation. Such separation is accomplished under carefully controlled conditions so that the interior of the grain, kernels, seeds or nuts, whether or not they are contaminated, are not penetrated, to any great extent, with the specific gravity separation medium. This process provides a means to separate the individual contaminated whole kernels which may otherwise be missed.

Flotation has been used in the past to separate oils, seeds, husks and fruits from non-edible contaminants, i.e. stones, rocks, stems, etc. It has also bee used to separate oils from other materials. However, flotation does not appear to have been used to separate aflatoxin-contaminated seeds, kernels, nuts or grain from wholesome products.

It is an object of this invention therefore to separate mycotoxin-contaminated nuts, kernels, seeds and grains from uncontaminated nuts, kernels, seeds and grains using a liquid specific gravity separation process.

It is a further object to separate otherwise good appearing but contaminated nuts, seeds, kernels or grains from other non-contaminated products, thus lowering the overall mycotoxin level of the product.

These and other objects will become apparent from the description of the invention.

SUMMARY OF THE INVENTION

The process described herein is for separating raw nuts, seeds, kernels or grains contaminated with aflatoxin from non-contaminated materials, by liquid flotation of the mycotoxin contaminated foods in water or other food-compatible liquid having a specific gravity of from about 0.9 to about 1.2.

DESCRIPTION OF THE FIGURES

FIG. 1 is a flow diagram of the process.

FIGS. 2 and 3 represent a preferred apparatus for separating the products. FIG. 2 is a top view of a dynamic separator. In FIG. 2, (1) represents a trough for separating the floating material; (3) is the bottom trough discharge in which the nuts, seeds, kernels or grain which sink are separated; (5) are channels through which the nuts and water flow, (7) is a device for prewetting the nuts; (9) is an adjustable baffle dam for separating the floater from sinkers; (11) is a floater discharge device; and (13) is a stoner and/or captive recirculating water system. FIG. 3 is a side view of the same apparatus and shows the movable gates and separators.

DESCRIPTION OF THE INVENTION

As previously mentioned, the fungi that produce aflatoxin grow under the same general conditions under which grains and nuts grow. These fungi can also proliferate under certain storage conditions. Thus grains, in particular corn and oats as well as nuts, particularly pecans, almonds, walnuts, and seeds or kernels, such as peanuts, are often contaminated with aflatoxin. The process of this invention applies to all of these kernels, seeds, grains and nuts which are hereinafter referred collectively to as "aflatoxin-contaminated food materials." This process is particularly useful for peanuts and will be exemplified by peanut separation but should not be considered as limited to peanuts.

Aflatoxin-contaminated food materials can be screened so that the whole products are retained on the screens and split or damaged materials are separated. An initial separation or screening procedure to remove any rocks and large particles of trash, hulls, twigs, etc. is recommended.

Generally, for peanuts the screen size will be chosen to retain whole nuts. All whole, undamaged nuts, no matter what the size, can be added from the remaining screens to the retained nuts. This initial screening removes any of the split or damaged product nuts which are less than a specific size.

Generally, peanuts have a moisture content in the range of about 6% to about 10.5%. Peanuts having a moisture content of about 6% to about 9% are preferred for use herein.

The flotation device comprises a container for the flotation medium and a screen, trough or other method of separating the floating aflatoxin-contaminated food materials from the uncontaminated kernels, nuts, seeds, grains or peanuts which sink. A simple flotation device is a barrel or a vat containing the flotation medium in which the floating products are separated by screening or sieving out.

Figure 1:
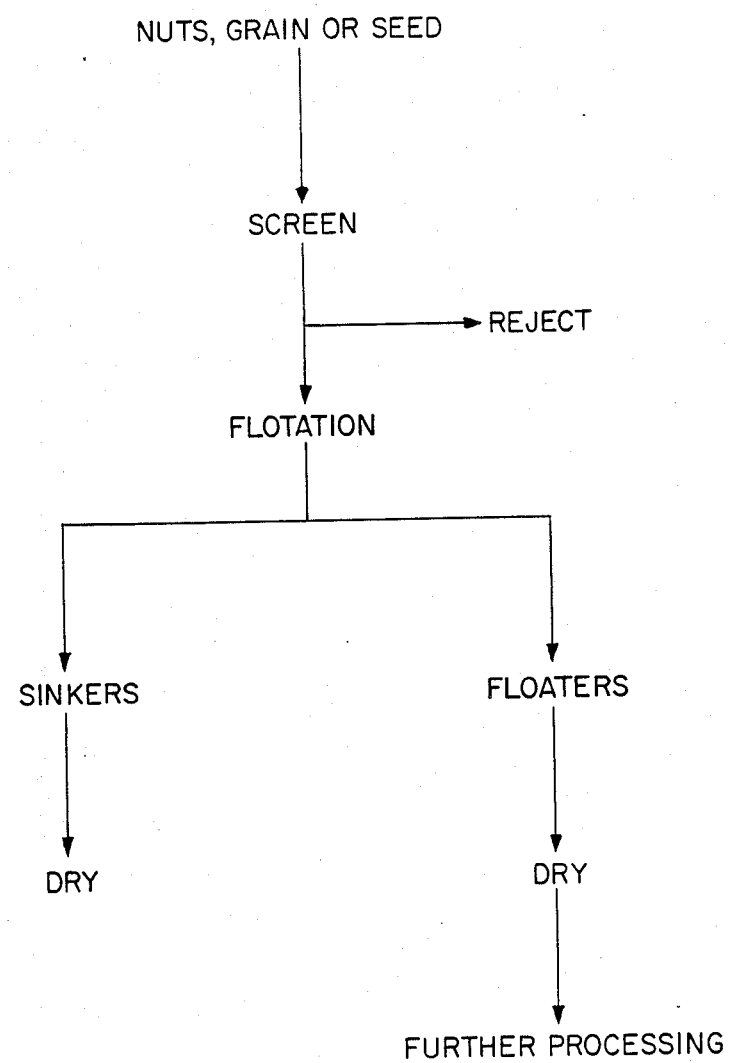
Figure 2:
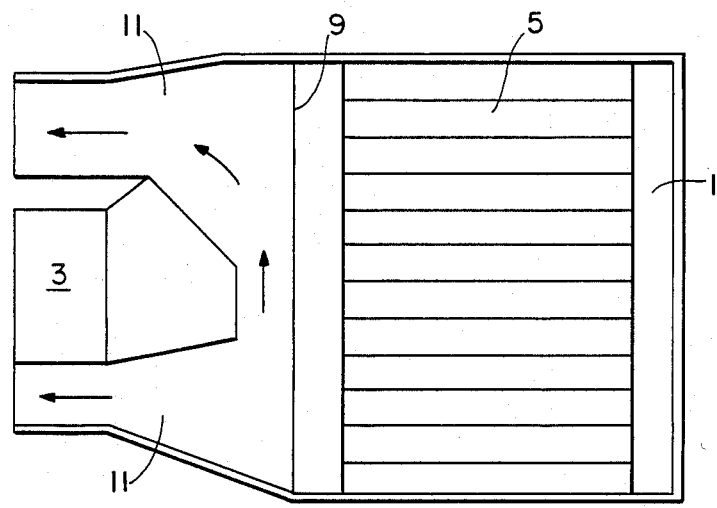
Figure 3:
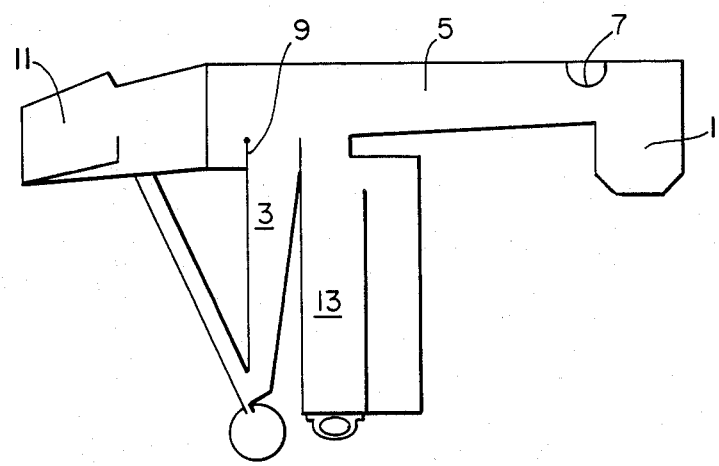

A preferred flotation device is that illustrated in FIGS. 2 and 3. This is an adaptation of a vegetable sorter, in particular a pea sorter, which was manufactured by George J. Olney, Inc., Westernville, N.Y. Other food processing equipment vendors have similar type machines which can be adapted for this process.

The aflatoxin-contaminated food materials are fed into the separation apparatus above (1) from a hopper down a vibrating screen. Water flows into sections (1), (3) and (13) and is passed through the chutes (5) with the food material. The floaters exit onto a vibrating mesh screen. The sinking peanuts are passed onto a second vibrating mesh screen.

The flotation medium is any material which has a specific gravity in the range of about 0.9 to about 1.2. The flotation medium must be edible and/or food-compatible since it will be contacting nuts, kernels, grains or seeds which are used for animal and human food. The preferred flotation medium is water. In addition to water, brine solutions, salt water, sugar solutions, glycerine, alcohols or alcohol/water solution and edible oils, can be used. Antioxidants, antifungals and antibacterial materials can be added to the flotation medium.

Preferred flotation mediums are water, 0.001 M to 1.0 M sodium chloride solutions, ethanol, ethanol/water mixtures, soybean oil, corn oil, peanut oil, and sunflower seed oil. The oils can be partially hydrogenated.

Preferably, the peanuts or other alfatoxin-contaminated food materials are prewetted or wetted during the first stage of the separation technique. The prewetting of the surface of the peanuts breaks the surface tension of the flotation medium, and allows the sinking peanuts to sink. This prewetting can be done by spraying the product before or as it enters the separation device, or by causing the product to go under the surface of the flotation medium as it enters the device. The prewetting should be done in a manner which minimizes the time the material is exposed to the medium. This avoids degradation of flavors in the material from exposure to higher moisture levels or other materials, i.e. oils and alcohol. It also avoids penetration of the interior of the product by the water or other flotation medium.

In general, uncontaminated seeds, kernels, nuts or grains have a specific gravity of greater than 1 and therefore sink. Whole peanuts, for example, average about 1.05 to about 1.2 in specific gravity. Aflatoxin-contaminated peanuts have a specific gravity of less than 1, usually in the range of about 0.98 to 0.99 and therefore float.

In a preferred embodiment, peanuts or other aflatoxin-contaminated food materials are fed to the separation device via a vibrating feeder. They then pass through a short slot or chute and across a small open slot to separate out the stones. Generally, there will be a slight water pressure coming up through the slot to keep the nuts or grains which ordinarily would sink in the flotation medium from sinking and only the heaviest materials, i.e. stones, can fall through. This pressure can be generated by water flow dynamics, generally less than ½ gallon per minute flow rate. Air, or any other pneumatic or hydraulic device can also be used.

The feed rate of peanuts (and other materials) to the separator is from about 4000 to 10,000 lbs/hr.

The peanuts are fed through a trough and down through water. If the nuts have been prewet, this extra immersion is not needed. The grain or nuts are passed through the flotation medium. The temperature of the flotation medium is not critical. Generally, temperature of 45° F. to 80° F. are acceptable. The floaters are discharged at the top and the sinkers are discharged at the bottom of the separator device.

The most highly preferred method involves dynamic flotation. In this method the aflatoxin-contaminated food materials are agitated while in contact with the medium. This can be accomplished through the use of vibrating screens, water pressure, water turbulence or air pressure. A flow rate of about 250 to about 350 gallons per minute of water or liquid is used. This flow rate, in combination with the above feed rate, provides good separation.

The floaters and the sinkers are then placed on a vibrating screen to remove any flotation medium, which is on the surface and easily drained off and recirculated if desired. Air can be circulated over this screen to accelerate the removal of the flotation medium.

The total exposure time of the nuts or grains to the flotation medium is generally less than 30 seconds, but can be as high as 5 minutes. The time period of exposure is determined by the time the medium could penetrate the food material and change its specific gravity and affect its flavor or texture. Moreover, penetration by the flotation medium of peanuts, nuts, or grains can cause flavor degradation over extended times. Water especially can cause this problem. The rate of exposure to the medium is generally less than 5 minutes. Preferably, the exposure is from about 5 seconds to about 180 seconds, and most preferably from about 5 seconds to about 30 seconds.

The sinking products are immediately passed into a drying unit. Any device that can evaporate the flotation medium can also be used. Microwave, radiant or convection heat can be used. The product is dried to its initial moisture content. For peanuts, this will be less than 10.5% and generally in the range of 6% to 9% water. It is important to dry the product back to its initial moisture content which indicates that the surface contamination of the flotation medium has been removed. Drying below the initial moisture content would be the removal of the moisture which is inside the nut or seed and this would change the product.

The temperature in the dryer is kept low so as not to heat damage or roast the nut or grain. Temperatures in the range of about 125° F. to about 250° F. are acceptable for most seeds, kernels, nuts and grains. The materials can be passed through a cooling device to cool them after they are dried.

If the flotation medium contains salt or sugar, or is other than water, it can be washed off with water before drying.

Substantially all of the whole peanuts which sink are nearly aflatoxin-free or contain very low levels of aflatoxin. These are then dried.

The dried peanuts can optionally be sent through a color sorter or other aflatoxin detector. Any dark or contaminated nuts which have made it through the system can be separated at this point. The light peanuts, nuts, grains, kernels or seeds are then processed for food, oil, and other edible uses.

A color sorter separates out aflatoxin-contaminated food products because they are usually darker than noncontaminated products. Product is supplied from the holding hopper to vibrating feed trays. The feed trays move product onto counter-rotating rollers. These rollers singulate product into single file so that each particle of product will be viewed separately while passing through the scanning head. As particles pass through the scanning head, each one is viewed by three photocells. These photocells detect the reflectance (brightness) of each particle as compared to a matched background plate. If the shade of a defect on the particle causes the reflectance to vary compared with that of the background, the particle can be rejected.

The scanning heat is internally illuminated. Light is reflected off the particles and a background plate into the photomultiplier optic elements.

The shade of the background plate is selected so light reflected from it has the same intensity as the light reflected by most of the particle area. Thus, the light reflected to the photomultiplier assembly appears the same whether there is a particle of uniform color falling through the aperture, or if the aperture is empty.

The floating nuts which contain higher levels of aflatoxin are dried. These can be optionally blanched, and then color sorted.

These nuts are blanched using conventional blanching techniques. In general, blanchers contain belts or rolls which remove the skin from the nut or grain and then, in the case of nuts, splits the nut into pieces. For peanuts, they are split into halves. These blanched, split nuts are color sorted using a visual light aflatoxin detector. The dark nuts, which are contaminated with aflatoxin, are separated from the lighter uncontaminated nuts. Those which pass the color sorting are generally acceptable for food processing. Those which are rejected in the color sorting are used for other purposes, or, a decision can be made as to whether or not they should be further processed.

In general, the preferred dynamic density separation process separates about 80% to about 95% of the peanuts as sinkers, or non-contaminated products, and about 5% to about 20% as floaters. The level will depend on the contamination of the product in the beginning. The aflatoxin level of the floaters is substantially higher than that of the starting sample and of the sinkers.

EXAMPLE 1

Forty-five thousand, four hundred (45,400) pounds of nuts containing 0.6% split peanuts, were screened. The initial moisture content is 7.5%. During the screening, 1.4% of the peanuts are rejected due to size, damaged nuts or as being split. Those that are retained on a 15/64 inch screen are then passed into a floating device, a modified sorter by Olney. The feeder is a vibrating screen operating at 66 lbs. to 166 lbs./min.

The peanuts are floated in water (4000 to 10,000 lbs of nuts/hr in water at a flow rate of 300–350 gal./min. (about 60° F.). The peanuts were wet by passing under a barrier as they entered the separator. About 90% of the nuts sank. About 10% of tne nuts floated. They pass through the separator in approximately 30 seconds. The pass through is about 5,000 lbs/hr. The final water content of the floated nuts is about 13±1%.

The nuts are then passed on a vibrating screen into a roaster containing three zones. The zone temperatures were 180° F., 130° F., and 130° F., respectively. The nuts are then passed through a cooler to bring them to ambient temperature of about 80° F. In general, the time from passing the nuts through the roaster is about 45 minutes. The system is set so that the total exposure of the peanuts to high water contents is less than about 3 minutes. The remainder of the drying time is to reduce the moisture back down to the initial level.

The peanuts which sank are then dried and passed through a color sorter equipped with a visual light detector. About 99.5% of the nuts were acceptable in color.

The total parts per billion aflatoxin in the starting peanuts was measured at less than 10 ppb on average. The acceptable nuts had an average aflatoxin reading of about 8 ppb.

The rejected nuts from this shrinking fraction represented about ½% when screened. the aflatoxin reading of the whole nuts in this rejected lot was approximately 22 ppb.

The floating nuts are separated, dried, and blanced. The aflatoxin reading was about 49 ppb. The blanched peanuts are then color sorted. About 91% of these nuts were acceptable for color. The aflatoxin reading of acceptable peanuts was approximately 14 ppb. These acceptable nuts were recycled into the feed nut stream for the flotation process. The rejected nuts which represented 8.7% of the original floaters, or approximately 2% of the starting nuts, had an aflatoxin reading of about 129 ppb.

This process is able to separate approximately 98% of the nuts having very low aflatoxin levels (less than 10 ppb) from that 2% which is highly contaminated with aflatoxin (levels about 10 ppb and up to 129 ppb).

EXAMPLE 2

A second lot of nuts with a aflatoxin level of approximately 4 ppb was treated as in the process of Example 1. In this lot 98.1% of the nuts sunk and 1.9% of the nuts floated. After drying, color sorting and rescreening, the whole good nuts 98.8% which sank contained approximately 1 ppb aflatoxin. The split nuts also contained about 1 ppb aflatoxin. The sinking nuts were color sorted. Those which were rejected by the color sorting of the sinking peanuts had an aflatoxin level of about 8 ppb.

Of the floaters, 92.9% blanched peanuts were acceptable by color sorting and had an aflatoxin level of about 5 ppb. About 7.1% of the rejected, blanched floating peanuts had an aflatoxin level of about 79 ppb.

What is claimed is:

1. A process for separating an aflatoxin-contaminated food material into fractions which are, respectively, aflatoxin-contaminated and substantially aflatoxin-free wherein said food material is selected from the group consisting of grains, kernels, seeds and nuts, the said process comprising:
    (a) contacting the aflatoxin-contaminated food material with a flotation medium having a specific gravity of from about 0.9 to about 1.2 thereby separating the food material into two fractions, that with a specific gravity less than the medium and that with a specific gravity equal or greater than that of the medium;
    (b) drying both fractions of the food material to their initial moisture content.

2. A process according to claim 1 wherein the fraction with a specific gravity less than the flotation medium is blanched and then dried.

3. A process according to claim 2 wherein each fraction is color sorted.

4. A process according to claim 3 wherein the feed rate of said aflatoxin-contaminated food material to the flotation medium is from about 4000 to about 10,000 pounds per hour.

5. A process according to claim 4 wherein the flotation medium has a specific gravity of from about 1.0 to about 1.05.

6. A process according to claim 5 wherein said flotation medium is water or dilute salt solutions.

7. A process according to claim 6 wherein said food material is peanuts.

8. A process according to claim 7 wherein said peanuts are prewet with water to a moisture content of about 13%.

9. A process according to claim 8 wherein said peanuts are dried at temperatures of from about 125° F. to about 250° F.

10. A process according to claim 8 wherein said flotation is carried out in less than 30 seconds.

11. A process according to claim 3 wherein said flotation medium is selected from the group consisting of brine, edible alcohols, glycerine sugar solutions, and edible oils.

12. A process according to claim 3 wherein said food material comprises a member of the group selected from corn, oats, almonds and walnuts.

13. A process for separating an alfatoxin-contaminated food material into fractions which are, respectively, aflatoxin-contaminated and substantially aflatoxin-free wherein said food material is selected from the group consisting of grains, kernels, seeds and nuts, the said process comprising:
    (a) contacting the aflatoxin-contaminated food material with a dynamic flotation medium having a specific gravity of from about 0.9 to about 1.2 thereby separating the food material into two fractions, that with a specific gravity less than the medium and that with a specific gravity equal or greater than that of the medium;
    (b) drying both fractions of the food material to their initial moisture content.

14. A process according to claim 13 wherein said flotation medium is water or dilute salt solutions.

15. A process according to claim 14 wherein the flow rate flotation medium is from 200 gallons per minute to 350 gallons per minute.

16. A process according to claim 15 wherein the flotation medium has a specific gravity of from about 1.0 to about 1.05.

17. A process according to claim 16 wherein the fraction with a specific gravity less than the flotation medium is blanched and then dried.

18. A process according to claim 17 wherein each fraction is color sorted.

19. A process according to claim 18 wherein said aflatoxin-contaminated food material is peanuts.

20. A process according to claim 19 wherein said peanuts are prewet with water to a moisture content of about 13%.

21. A process according to claim 20 wherein said peanuts are dried at temperatures of from about 125° F. to about 250° F.

22. A process according to claim 21 wherein said flotation is carried out in less than 30 seconds.

23. A process according to claim 16 wherein said flotation medium is selected from the group consisting of brine, edible alcohols, glycerine sugar solutions, and edible oils.

24. A process according to claim 16 wherein said aflatoxin-contaminated food material comprises a member of the group selected from corn, oats, almonds and walnuts.

* * * * *